(12) United States Patent  (10) Patent No.: US 8,363,395 B2
Matsui  (45) Date of Patent: Jan. 29, 2013

(54) RELEASE MECHANISM FOR ELECTRONIC DEVICE UNIT AND DISK ARRAY DEVICE

(75) Inventor: Jun Matsui, Nagoya (JP)

(73) Assignee: Buffalo Inc., Nagoya-shi (JP)

( * ) Notice: Subject to any disclaimer, the term of this patent is extended or adjusted under 35 U.S.C. 154(b) by 311 days.

(21) Appl. No.: 12/903,130

(22) Filed: Oct. 12, 2010

(65) Prior Publication Data

US 2011/0090638 A1  Apr. 21, 2011

(30) Foreign Application Priority Data

Oct. 15, 2009  (JP) .................................. 2009-237988

(51) Int. Cl.
    *G06F 1/16* (2006.01)
(52) U.S. Cl. ................................................. 361/679.37
(58) Field of Classification Search ............. 361/679.37, 361/679.33
    See application file for complete search history.

(56) References Cited

U.S. PATENT DOCUMENTS 7,715,184 B2 *  5/2010  Yang ......................... 361/679.37
8,191,842 B2 *  6/2012  Tsai .......................... 248/222.12
8,248,775 B2 *  8/2012  Zhang et al. ............. 361/679.33
8,259,441 B2 *  9/2012  Chuang ..................... 361/679.31
2006/0232923 A1 * 10/2006 Liang ............................. 361/685
2006/0245160 A1 * 11/2006 Zhang et al. ................... 361/685
2008/0123279 A1 *  5/2008  Chih et al. ..................... 361/685

FOREIGN PATENT DOCUMENTS

| JP | 8-212016 | 8/1996 |
| JP | 10-50048 | 2/1998 |
| JP | 2003-216277 | 7/2003 |
| JP | 2004-54967 | 2/2004 |

* cited by examiner

*Primary Examiner* — Lisa Lea Edmonds
(74) *Attorney, Agent, or Firm* — Beyer Law Group LLP (57) ABSTRACT

The release mechanism includes a guide body adapted to support a guide wall of the electronic device unit, and a locking mechanism adapted to lock the electronic device unit supported on the guide body. The locking mechanism includes an elastic piece projecting in cantilever fashion from an end of the guide body, an operating projection that projects from the elastic piece, and an engaging protrusion that protrudes from the elastic piece and that is adapted to intrude into a screw hole in the electronic device unit to thereby restrict sliding of the electronic device unit. The operating projection is formed with larger size than the engaging protrusion so that under conditions of induced flexure of the elastic piece the engaging protrusion disengages from the screw hole, and during sliding of the electronic device unit does not contact the guide wall.

14 Claims, 7 Drawing Sheets

RELEASE MECHANISM FOR ELECTRONIC DEVICE UNIT AND DISK ARRAY DEVICE

This application claims the benefit of and priority from Japanese Application No. 2009-237988 filed Oct. 15, 2009, the content of which is incorporated herein by reference.

BACKGROUND OF THE INVENTION

1. Field of the Invention

The present invention relates to an electronic device unit release mechanism, to a release mechanism for electronic device units housing a plurality of detachable electronic device units, and to a disk array device.

2. Description of the Related Art

With a view to achieving faster speeds, higher capacities, and better reliability in external storage devices, disk array devices designed to accommodate several electronic device units housing hard disk drives (HDD) have become available recently.

Release mechanisms for detaching the electronic device units in such conventional disk array devices include arrangements in which a bracket or tray is installed on the electronic device unit, or in which an electronic device unit of standard design is secured and screwed into a frame using the screw holes provided to the unit; however, such arrangements involve many parts, and the cumbersome installation procedure was also a problem. The related arts are described in JP-A 08-212016, JP-A 10-50048, JP-A 2003-216277 and JP-A 2004-54967.

SUMMARY

An advantage of some aspects of the invention is to provide an electronic device unit release mechanism and a disk array device having few parts and affording simplicity of operations to attach and detach the electronic device units.

According to an aspect of the invention there is provided with a release mechanism for an electronic device adapted to detachably house an electronic device unit. The release mechanism comprises a guide body adapted to slidably support a guide wall of the electronic device unit; and a locking mechanism adapted to lock the electronic device unit supported on the guide body. The locking mechanism includes an elastic piece projecting in cantilever fashion from an end of the guide body, an operating projection that projects from the elastic piece, and an engaging protrusion that protrudes from the elastic piece and that is adapted to intrude into a screw hole of the electronic device unit to thereby restrict sliding of the electronic device unit. The operating projection is formed with larger size than the engaging protrusion so that the engaging protrusion disengages from the screw hole and then the electronic device unit slides on the guide body without the engaging protrusion contacting with the guide wall of the electronic device unit, when the elastic piece is elastically deformed and external force is applied to the electronic device unit in a sliding direction.

According to the electronic device unit release mechanism of the first aspect, for positioning purposes, a standard screw hole provided for fastening purposes on the guide wall of the electronic device unit engages a catch projection provided on the guide member, making the arrangement compatible with electronic device units of standard design. The release mechanism is thus provided with a simple design that does not require furnishing the electronic device units with separate components such as a bracket or tray.

The electronic device unit can be detached from the release mechanism by inducing flexure of the elastic piece and pulling out the grip portion of the ejection member; meanwhile, the electronic device unit can be installed in the storage space by inducing flexure of the elastic piece and pushing the unit in onto the guide member. Thus, a fastening procedure using screws or the like is not required to install the electronic device unit, making for an extremely easy installation procedure.

During attachment or detachment, by inducing flexure of the elastic piece of the release mechanism, the catch projection can be disengaged from the screw hole of the electronic device unit, and during sliding of the electronic device unit over the top of the upper support portion does not become caught in the screw holes, thus affording smooth attachment and detachment operations.

In an electronic device unit release mechanism according to a second aspect, the operating projection has a sloping guide face that slopes in such a way as to guide the guide walls of the electronic device unit towards the guide body with the elastic piece held flexed.

According to a third aspect there is additionally provided an ejection member adapted to apply external force in the direction of withdrawing the electronic device unit; the ejection member includes an ejection member body, a grip portion formed at one end of the ejection member body, and a inflected pushing portion formed at the other end of the ejection member body, the inflected pushing portion being inflected in such a way as to push against the back wall of the electronic device unit.

According to a fourth aspect, the inflected pushing portion has a pushing end inflected so to push against the midpoint of the back wall of the electronic device unit. According to this feature, the pushing end inflected from the ejection member body pushes against the back wall of the electronic device unit in the approximately center portion thereof so that the ejection member may move the electronic device unit smoothly and without tilting.

According to a fifth aspect, the grip portion is ring-shaped making it readily apparent that the grip portion is intended to be pulled, thus providing an intuitive interface.

Another aspect provides a disk array device detachably housing the electronic device unit in the release mechanism.

The disk array device comprises an ejection member that is configured such that the grip portion lies partially exposed through the opening when the front cover is detached from the casing body, and becomes entirely exposed, the ejection member being movable in the sliding direction without application of external force to the electronic device unit.

These and other objects, features, aspects, and advantages of the present invention will become more apparent from the following detailed description of the preferred embodiments with the accompanying drawings.

DESCRIPTION OF THE PREFERRED EMBODIMENTS (1) Features of Disk Array Device 10

Figure 1:
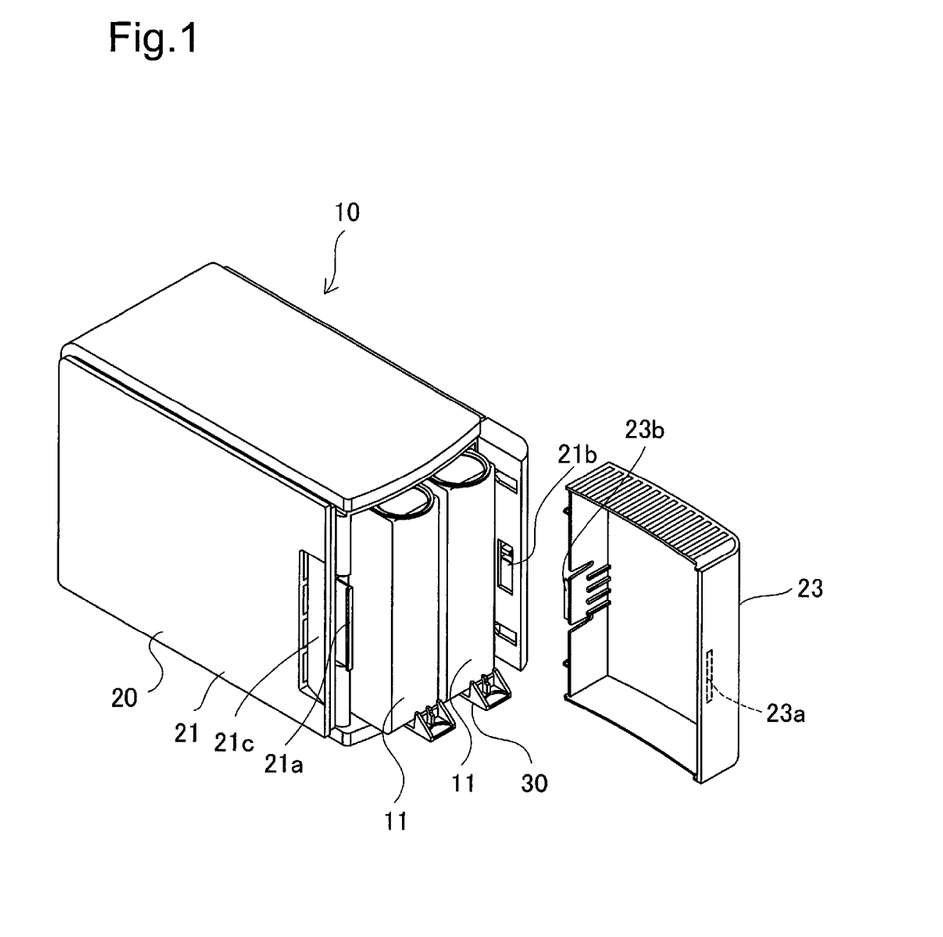
FIG. 1 is a perspective view showing a disk array device according to an embodiment of the invention.
Figure 2:
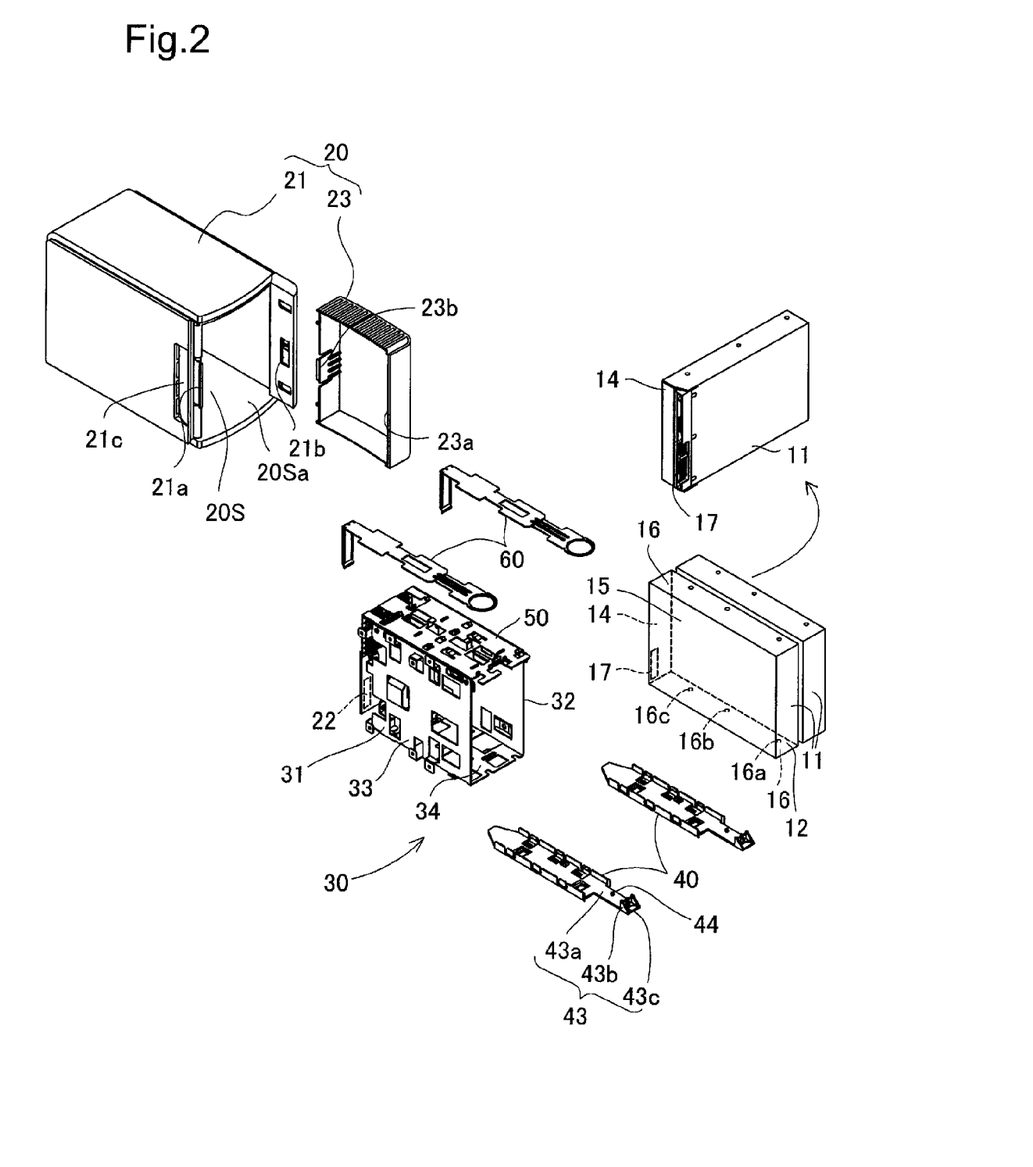
FIG. 2 is an exploded perspective view of the disk array device.

FIG. 1 is a perspective view showing a disk array device 10 according to an embodiment of the invention. FIG. 2 is an exploded perspective view of the disk array device 10. The disk array device 10 is designed to accommodate two standard hard disk drives so as to allow drive swapping, and includes two electronic device units 11 (hard disk drives), a casing 20 that houses the electronic device units 11, and a release mechanism 30 for detachably installing the electronic device units 11. The device is designed so that if needed, the electronic device units can be detached manually from the casing 20 through the agency of the release mechanism 30.

(2)-1 Electronic Device Units 11

In FIG. 2, the electronic device units 11 are composed of standard 3.5 inch hard disk drives, and are housed in a unit case composed of a front wall 12, a back wall 14, side walls 15, 15, and guide wall 16, 16. A connector 17 for connection to an external electronic device is provided on the back wall 14 of the electronic device unit 11. In each of the guide wall 16, 16 there are formed screw holes 16a, 16b, 16c that provide the electronic device unit 11 with a standardized design for securing it to another electronic device.

(2)-2 Casing 20

The casing 20 contains a housing space 20S defined by a casing body 21 and a front cover 23. The electronic device units 11 and the release mechanism 30 are housed inside the housing space 20S. The housing space 20S has an opening 20Sa that is exposed to the outside when the front cover 23 is detached from the casing body 21. The front cover 23 has cover engaging portions 23a, 23b designed to engage engaging portions 21a, 21b on the casing body 21, and may be detached by pushing on a push portion 21c on the casing body 21.

(2)-3 Release Mechanism 30

Figure 3:
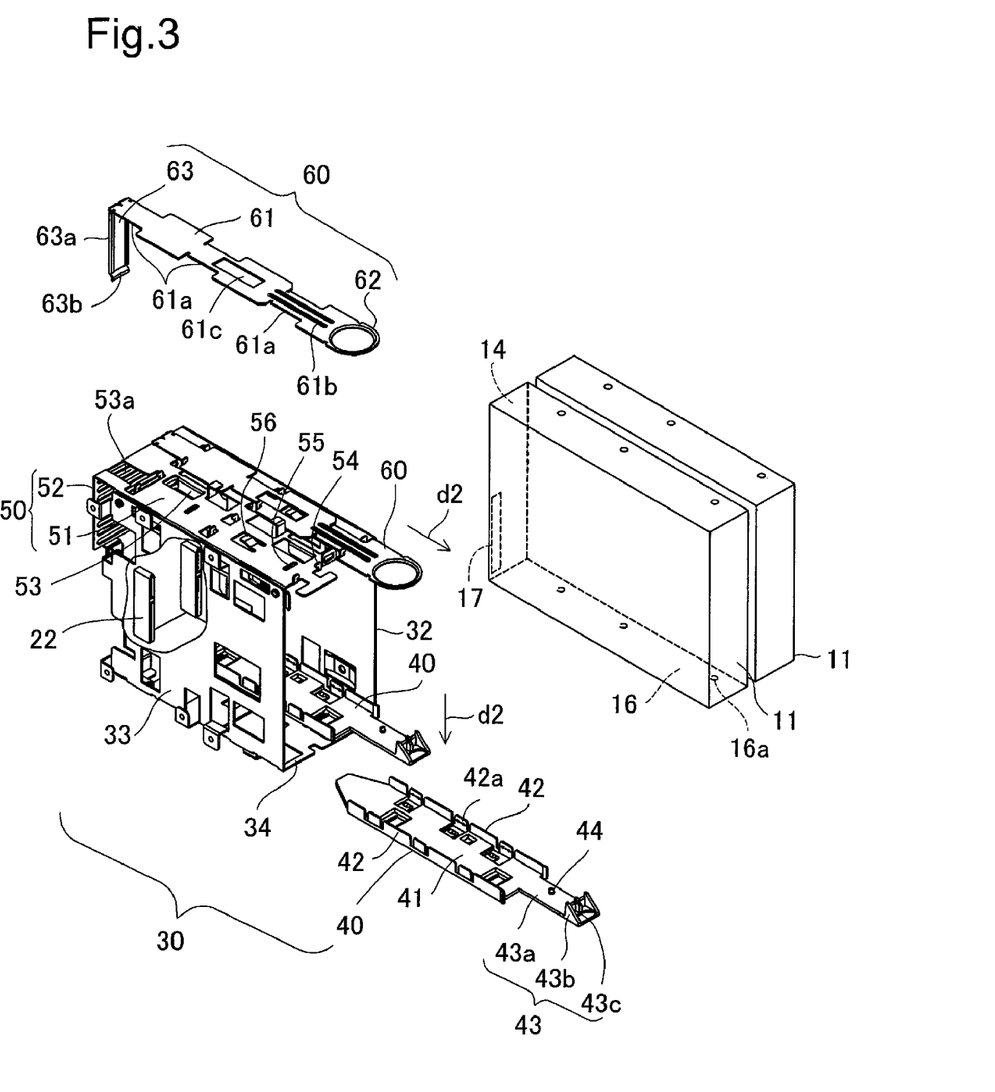
FIG. 3 is an exploded perspective view of a release mechanism.
Figure 4:
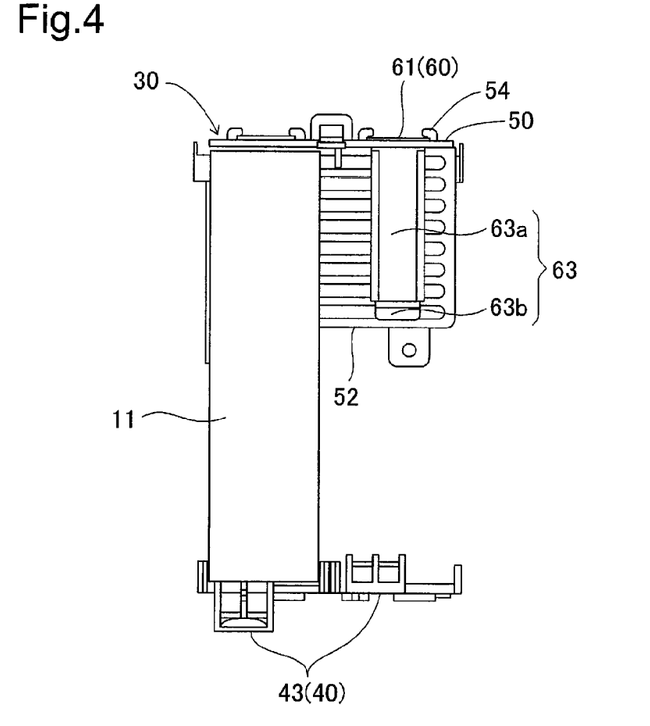
FIG. 4 is a front view of the release mechanism, shown with one electronic device unit installed.

FIG. 3 is an exploded perspective view of the release mechanism 30, and FIG. 4 is a front view of the release mechanism 30, shown with one of the electronic device units 11 installed. In FIG. 3, the release mechanism 30 is composed of a support frame 31 made of metal, two guide members 40, 40 made of resin (polycarbonate), and two ejection members 60, 60 made of metal. The support frame 31 includes side support plates 32, 33, a lower support plate 34, and an upper support portion 50, which together define a cuboid. On the back portion of the support frame 31 there are provided connectors 22 for connection to the connectors 17 of the electronic device units 11 via electronic circuit boards (not shown).

Each guide member 40 includes a guide body 41 secured by a catch hook to the lower support plate 34 and adapted to slide the guide wall 16 of the electronic device unit 11, and side guides 42 formed at both sides of the guide body 41. The side guides 42 have guide pieces 42a of cantilever design with protruding distal edges. A hook 43 is formed at the distal end of the guide body 41. The hook 43 includes an elastic piece 43a of cantilever design, an operating projection 43b formed at the distal end of the elastic piece 43a, and a sloping guide face 43c formed on the front end of the operating projection 43b. An engaging protrusion 44 adapted to engage the screw holes 16a of the electronic device unit 11 projects up from the elastic piece 43a. The hook 43 and the engaging protrusion 44, together with the screw holes 16a of the electronic device unit 11, constitute a locking mechanism.

The upper support portion 50 is disposed spanning across the top edges of the side support plates 32, 33 and facing the guide members 40 and is designed to support the electronic device units 11 at their other guide wall 16, and includes a support body 51 and a back face plate 52 that inflects from one end of the support body 51. Insertion apertures 53a are formed in the end part of the support body 51. In the upper support portion 50 there are also formed a two-sided guide 53, a guide retainer 54, a slide projection 55, and a stopper piece 56, provided by way of an arrangement allowing the ejection member to slide within a prescribed range.

The ejection member 60 is a component adapted to apply external force to the electronic device unit 11 in the withdrawal direction d2, and is slidably supported on the upper support portion 50. The ejection member 60 includes an ejection member body 61, a grip portion 62 formed at one end of the ejection member body 61, and a inflected pushing portion 63 that inflects at the other end of the ejection member body 61. At either side of the ejection member body 61, guided portions 61a are formed at three locations. The guided portions 61a are slidably retained at both sides by the guide retainer 54 of the upper support portion 50 to ensure smooth sliding of the ejection member 60 over the upper support portion 50. At the grip portion 62 end of the ejection member body 61 there is formed a slit 61b designed to provide shock absorption by pushing against the slide projection 55 to induce flexure. A guide aperture 61c is formed midway along the ejection member body 61. The guide aperture 61c comes into abutment with the stopper piece 56 of the upper support portion 50 thereby limiting slide of the ejection member 60.

The grip portion 62 takes the form of a ring formed at the end of the ejection member body 61, and serves as an area for the fingers to apply external force to the ejection member 60 in the withdrawal direction d2. The inflected pushing portion 63 includes a pushing piece 63a of cantilever design bending down from the end of the ejection member body 61, and a pushing edge 63b that in turn bends from the distal end of the pushing piece 63a. The pushing edge 63b inflects in such a way that the pushing piece 63a does not come into contact with the back wall 14 of the electronic device unit 11.

According to the features of the upper support portion 50 and the ejection member 60 described above, when the grip portion 62 is grasped with the fingers and external force is applied to the ejection member 60 in the arrow direction d2, with the guide retainer 54 limiting backlash of the guided portions 61a in the perpendicular direction to the arrow direction d2 and with contact with the slide projection 55 affording reduced friction at the lower face of the ejection member body 61, the ejection member 60 advances to the point that the pushing edge 63b of the inflected pushing portion 63 pushes against the back wall 14 of the electronic device unit 11, and moves the electronic device unit 11 towards the arrow direction d2.

(3) Operation to Eject or Install Electronic Device Units 11 in Disk Array Device 10

(3)-1 Electronic Device Unit 11 Ejection Operation

Figure 5:
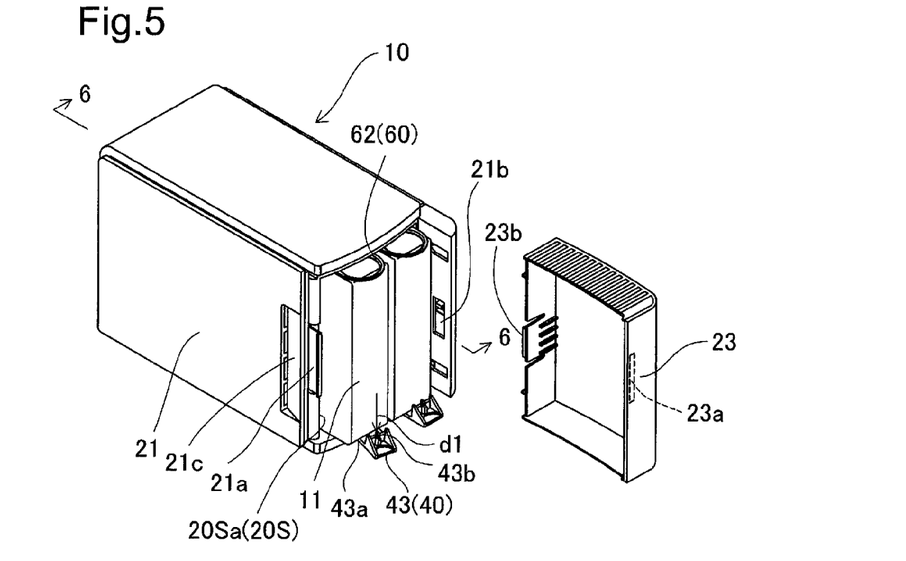
FIG. 5 shows the procedure for detaching an electronic device unit from the disk array device.
Figure 6:
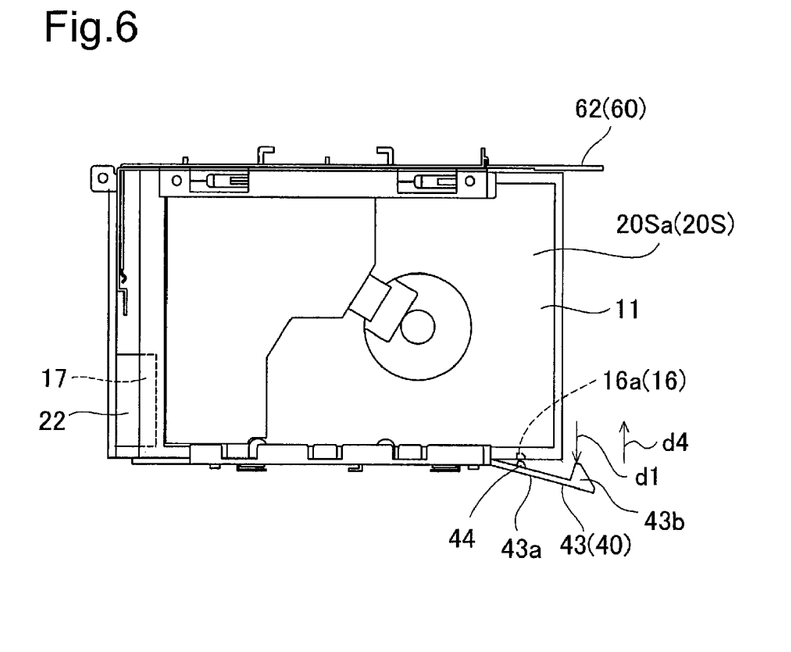
FIG. 6 is a sectional view taken along line 6-6 in FIG. 5.
Figure 7:
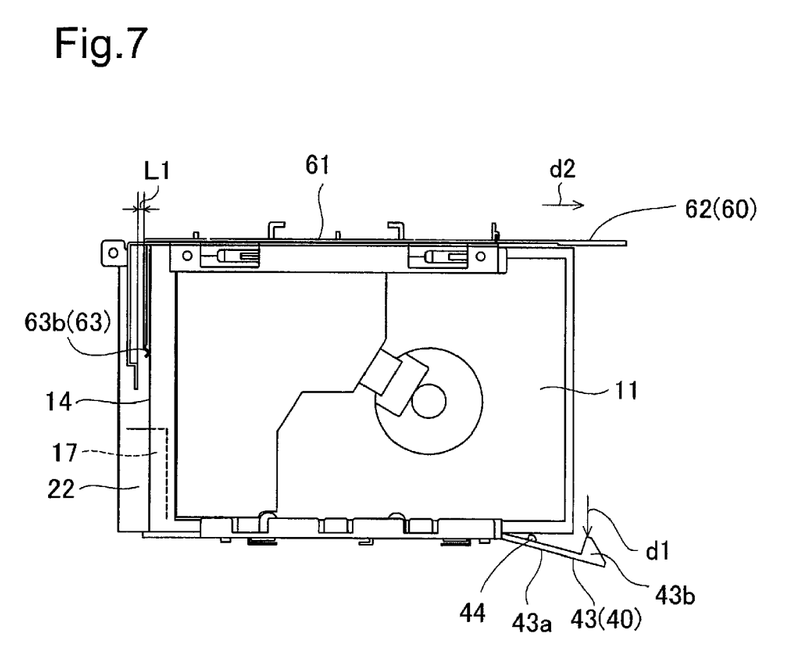
FIG. 7 shows the operation, continuing from FIG. 6.
Figure 8:
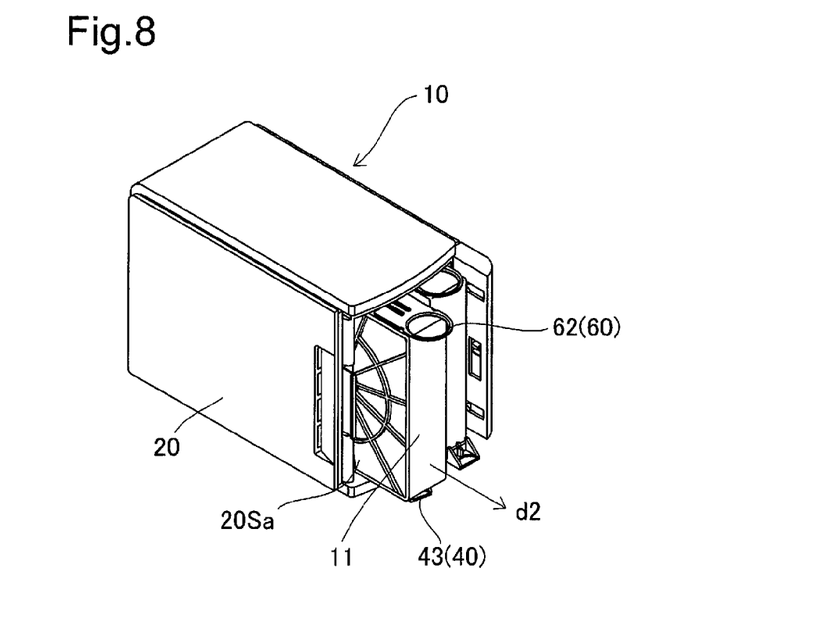
FIG. 8 shows the operation, continuing from FIG. 5.
Figure 9:
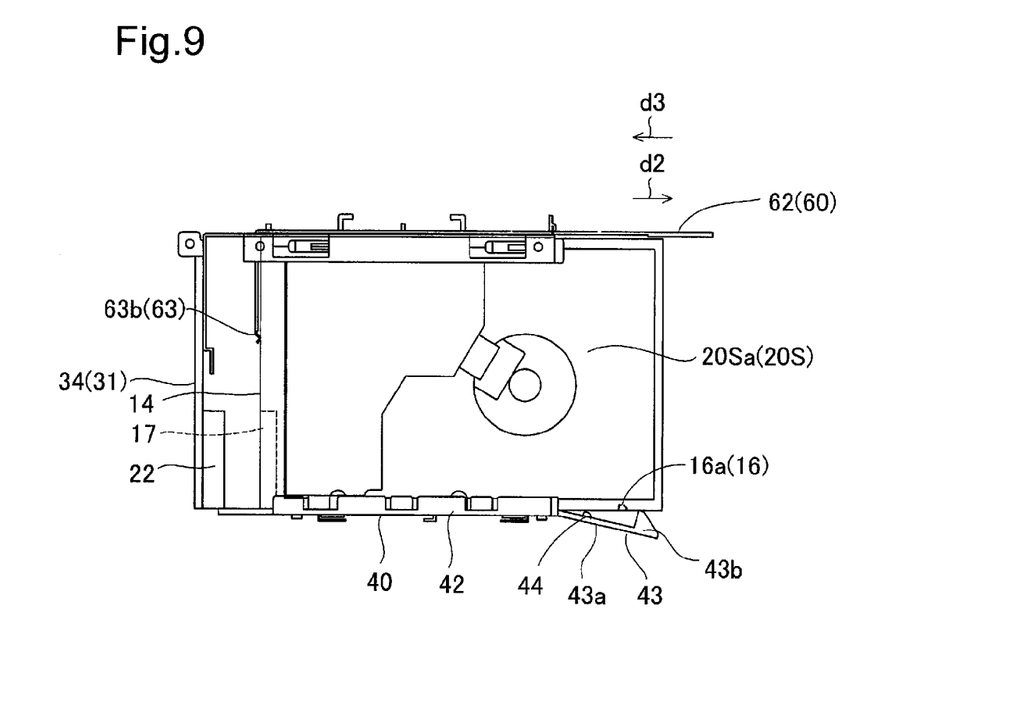
FIG. 9 shows the operation, continuing on from FIG. 7.
Figure 10:
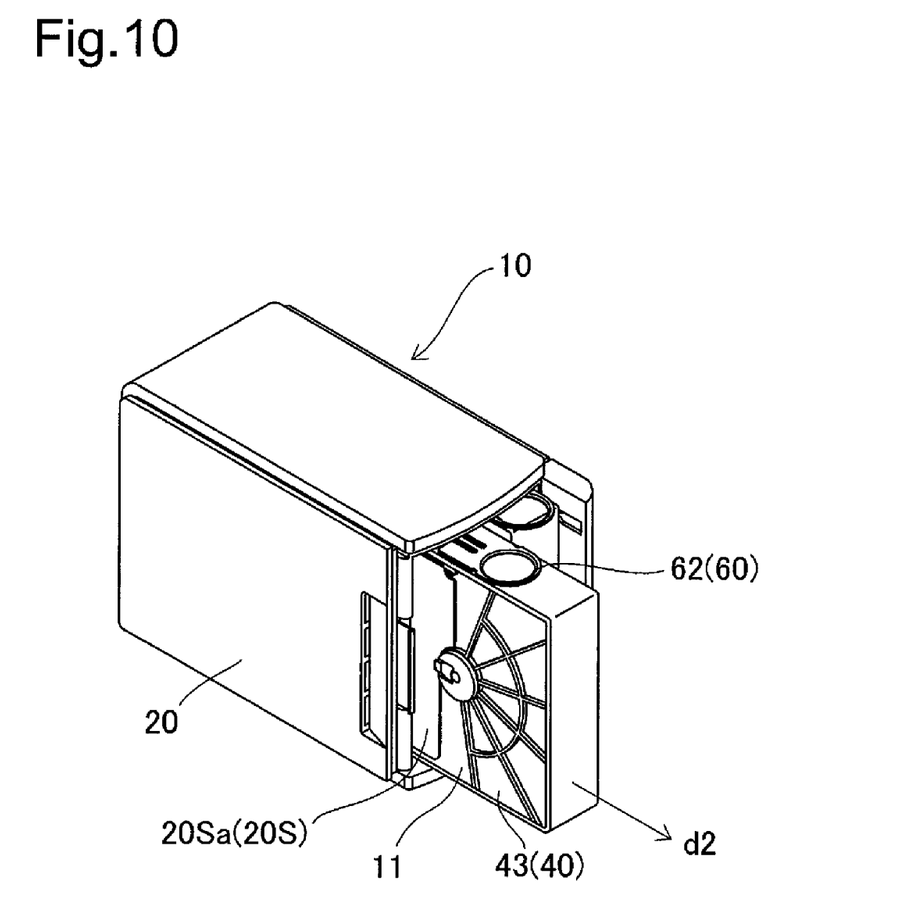
FIG. 10 shows the operation, continuing on from FIG. 9.

As depicted in FIG. 5, to eject an electronic device unit 11 from the disk array device 10, after turning off the power to the disk array device 10, one pushes on the push portion 21c in proximity to the engaging portion 21a of the casing body 21 to expand the gap at the engagement location through elastic deformation, then detaches the hooks of the cover engaging portions 23a, 23b of the front cover 23 from the engaging portions 21a, 21b of the casing body 21 at their two fastening locations, and removes the front cover 23 from the casing body 21. Next, the operating projection 43b of the hook 43 of the guide member 40 is pressed downward (arrow direction d1) to induce elastic deformation of the elastic piece 43a, which is then maintained in this condition. At this point, as shown by the release mechanism 30 in FIG. 6, the engaging protrusion 44 disengages from the screw hole 16a of the electronic device unit 11. Then, as shown in FIG. 7 the grip portion 62 of the ejection member 60 is grasped with the fingers and pulled towards the arrow direction d2 so that external force is applied to the ejection member 60 in this direction. The pushing edge 63b of the ejection member 60 moves it by a distance L1 equal to its play until coming into abutment against the back wall 14 of the electronic device unit 11. Then, as depicted in FIG. 8 and FIG. 9, as the grip portion 62 is pulled, the pushing edge 63b pushes the back wall 14 of the electronic device unit 11 in the arrow direction d2. This pushing force causes the electronic device unit 11 to move across the upper face of the guide member 40 while guided by the side guides 42 (see FIG. 3). At this point, the connector 17 on the electronic device unit 11 disconnects from the connector 22 of the lower support plate 34 of the support frame 31. In this state, the operating projection 43b of the hook 43 is depressed by the guide wall 16 (bottom face) of the electronic device unit 11 causing the elastic piece 43a to flex, whereupon the engaging protrusion 44 separates from the bottom face if the electronic device unit 11 and does not become caught in the screw hole 16a of the electronic device unit 11 so as to impose no obstruction during sliding. Then, as depicted in FIG. 10, as the grip portion 62 of the ejection member 60 is pulled along, when the end edge of the guide aperture 61c of the ejection member 60 comes into abutment against the stopper piece 56 (see FIG. 3), further movement is restricted. At this point, the front half of the electronic device unit 11 has exited through the opening 20Sa of the casing 20, and the electronic device unit 11 can be grasped to be remove by the user.

(3)-2 Electronic Device Unit 11 Installation Operation

To install the electronic device unit 11 in the disk array device 10, the user carries out an operation that is the opposite of the ejection operation described above. Specifically, starting from the state depicted in FIG. 10, the front half of the electronic device unit 11 is grasped while tilting it, and as shown in FIG. 9, is inserted through the opening 20Sa of the housing space 20S with the guide wall 16 positioned in contact against the inclined guide face 43c of the hook 43. The guide wall 16 of the electronic device unit 11 is then placed on the guide member 40, and the electronic device unit 11 is pushed in the arrow direction d3. As shown in FIG. 7, when the back wall 14 of the electronic device unit 11 comes into abutment against the pushing edge 63b of the inflected pushing portion 63 of the ejection member 60, the ejection member 60 moves in the same direction in unison. Once the electronic device unit 11 is pushed to the back, as shown in FIG. 6 the connector 17 of the electronic device unit 11 connects to the connector 22 of the casing 20, and the front face of the electronic device unit 11 rides over the operating projection 43b of the hook 43 so that the engaging protrusion 44 integrally formed with the elastic piece 43a now intrudes into the screw hole 16a of the electronic device unit 11, and the elastic piece 43a returns towards the arrow direction d4 due to its elastic force. The engaging protrusion 44 integrally formed with the elastic piece 43a thereby intrudes into the screw hole 16a of the electronic device unit 11 so that the electronic device unit 11 is locked inside the housing space 20S. The front cover 23 is then replaced covering the opening 20Sa of the casing 20 as shown in FIG. 5. At this point, the grip portion 62, pushed by the back face of the front cover 23, moves to the back by a distance equal to the play of the ejection member 60. This completes the installation operation of the electronic device unit 11.

(4) The Embodiment Set Forth Above Affords the Following Working Effects.

(4)-1 As depicted in FIG. 6, in the release mechanism 30 of the disk array device 10, the standard screw hole 16a for fastening purposes formed on the guide wall 16 of the electronic device unit 11 engages the engaging protrusion 44 of the guide member 40 and thereby utilized for positioning purposes, making the arrangement compatible with electronic device units 11 of standard design. The release mechanism 30 is thereby endowed with a simple design that does not require providing the electronic device unit 11 with separate components such as a bracket or tray.

(4)-2 As depicted in FIGS. 5 and 6, the release mechanism 30 allows the electronic device unit 11 to be detached after removing the front cover 23, by inducing flexure of the hook 43 and pulling the grip portion 62 of the ejection member 60; while the electronic device unit 11 can be installed in the housing space 20S by inducing flexure of the hook 43 and pushing the unit on the guide member 40. Thus, no fastening procedure using screws or the like is required to install the electronic device unit 11, making for an extremely easy installation procedure.

(4)-3 By inducing flexure of the hook 43 of the release mechanism 30 during detachment, the catch projection 44 can be disengaged from the screw hole 16a of the electronic device unit 11, and during sliding of the electronic device unit 11 over the top of the upper support portion 50 does not become caught in the screw holes 16b, 16c, thus affording smooth attachment and detachment operations.

(4)-4 The guide face 43c of the guide member 40 functions as a sloping face for guiding the electronic device unit 11 over the guide member 40 and inducing flexure of the hook 43, making it easy to direct the electronic device unit 11 onto the guide member 40.

(4)-5 As depicted in FIG. 9, the pushing edge 63b of the inflected pushing portion 63 that inflects from the ejection member body 61 pushes against the back wall 14 of the electronic device unit 11 in the approximately center portion thereof so that the ejection member 60 may move the electronic device unit 11 smoothly without tilting.

(4)-6 As depicted in FIG. 6, with the front cover 23 detached from the casing 20, the front half of the ring-shaped grip portion 62 of the ejection member 60 is exposed, making it readily apparent that the grip portion 62 is intended to be pulled, thus providing an intuitive interface.

(4)-7 With the front cover 23 detached, the ring of the grip portion 62 is partially concealed, but when pulled out gently with the fingers slides by a distance L1 equivalent to the play of the ejection member 60 and becomes totally exposed as depicted in FIG. 7, and is thus easily gripped with the fingers to provide excellent ease of operation.

(4)-8 As depicted in FIGS. 7 and 9, connection/disconnection of the connector 17 of the electronic device unit 11 and the connector 22 of the casing 20 takes place simultaneously with pulling of the ejection member 60 or pushing in of the electronic device unit 11, thus provide excellent ease of operation during connection.

(4)-9 As depicted in FIG. 3, the guide pieces 42a of the guide member 40 support the lower portion of the electronic device unit 11 by virtue of elastically deformable projections of cantilever design, thus providing smooth sliding operation of the electronic device unit 11.

It is to be understood that there is no intention to limit the invention to the embodiment disclosed herein, and that modifications such as the following are to be included among various possible alternative modes considered to fall within the spirit and scope of the invention.

Whereas the preceding embodiment described the electronic device units 11 of the disk array device 10 as consisting of two 3.5-inch hard disk drives, no particular limitation is imposed thereby as to the size and number of hard disk drives, and equivalent swappable arrangements of 2.5-inch hard disk drives, or of a single or three or more hard disk drives, are acceptable as well; as are other devices such as DVD drives, or appropriate combinations of the above, provided that the devices are swappable.

In the preceding embodiment, an L shaped metal fixture was employed as the ejection member for applying external force to the electronic device unit 11, but no particular limitation is imposed thereby, and alternative means such as a component which consists of a separate element situated in proximity to the hook 43 or integrally formed with the hook would be acceptable, provided it can apply external pressure.

Additionally, to ensure ease of operation while also protecting the electronic device units 11, power to the disk array device 10 may be designed to shut off in interlocked operation with pulling of the grip portion 62, as an alternative to carrying out the ejection or installation procedure after turning off the main switch.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A release mechanism for an electronic device adapted to detachably house an electronic device unit, comprising:
    a guide body adapted to slidably support a guide wall of the electronic device unit; and
    a locking mechanism adapted to lock the electronic device unit supported on the guide body;
    wherein the locking mechanism includes (i) an elastic piece projecting in cantilever fashion from an end of the guide body, (ii) an operating projection that projects from the elastic piece, and (iii) an engaging protrusion that protrudes from the elastic piece and that is adapted to intrude into a screw hole of the electronic device unit to thereby restrict sliding of the electronic device unit; and
    the operating projection is formed with larger size than the engaging protrusion so that the engaging protrusion disengages from the screw hole and then the electronic device unit slides on the guide body without the engaging protrusion contacting with the guide wall of the electronic device unit, when under inducing flexure of the elastic piece, external force is applied to the electronic device unit in a sliding direction.

2. The release mechanism in accordance with claim 1 wherein
    the operating projection has a sloping guide face that is sloped so as to guide the guide wall of the electronic device unit towards the guide body under inducing flexure of the elastic piece.

3. The release mechanism in accordance with claim 2, further comprising an ejection member adapted to apply force to the electronic device unit in a withdrawal direction;
    wherein the ejection member includes an ejection member body, a grip portion formed at one end of the ejection member body, and an inflected pushing portion formed at the other end of the ejection member body, the inflected pushing portion being inflected so as to push against a back wall of the electronic device unit.

4. The release mechanism in accordance with claim 3 wherein
    the inflected pushing portion has a pushing edge that inflects so as to push against the back wall of the electronic device unit at midpoint.

5. The release mechanism in accordance with claim 4 wherein the grip portion is ring shaped.

6. The release mechanism in accordance with claim 3 wherein the grip portion is ring shaped.

7. The release mechanism in accordance with claim 2, further comprising an ejection member adapted to apply force to the electronic device unit in a withdrawal direction;
    wherein the ejection member includes an ejection member body, a grip portion formed at one end of the ejection member body, and an inflected pushing portion formed at the other end of the ejection member body, the inflected pushing portion being inflected so as to push against a back wall of the electronic device unit.

8. The release mechanism in accordance with claim 7 wherein
    the inflected pushing portion has a pushing edge that inflects so as to push against the back wall of the electronic device unit at midpoint.

9. The release mechanism in accordance with claim 8 wherein the grip portion is ring shaped.

10. The release mechanism in accordance with claim 7 wherein the grip portion is ring shaped.

11. A disk array device comprising: a casing that includes a casing body having a housing space and a front cover to open and close an opening of the casing body; and a release mechanism that is housed in the housing space, wherein release mechanism includes a guide body adapted to slidably support a guide wall of the electronic device unit; and a locking mechanism adapted to lock the electronic device unit supported on the guide body; wherein the locking mechanism includes (i) an elastic piece projecting in cantilever fashion from an end of the guide body, (ii) an operating projection that projects from the elastic piece, and (iii) an engaging protrusion that protrudes from the elastic piece and that is adapted to intrude into a screw hole of the electronic device unit to thereby restrict sliding of the electronic device unit; and the operating projection is formed with larger size than the engaging protrusion so that the engaging protrusion disengages from the screw hole and then the electronic device unit slides on the guide body without the screw hole contacting with the guide wall when under inducing flexure of the elastic piece, external force is applied to the electronic device unit in a sliding direction.

12. The disk array device in accordance with claim 11, further comprising an ejection member adapted to apply force to the electronic device unit in a withdrawal direction;
    wherein the ejection member includes an ejection member body, a grip portion formed at one end of the ejection member body, and an inflected pushing portion formed at the other end of the ejection member body, the inflected pushing portion being inflected so as to push against a back wall of the electronic device unit.

13. The disk array device in accordance with claim 12 wherein,
    the ejection member is configured such that the grip portion lies partially exposed through the opening when the front cover is detached from the casing body, and becomes entirely exposed, the ejection member being movable in the sliding direction without application of external force to the electronic device unit.

14. The disk array device in accordance with claim 13 wherein the grip portion is ring shaped.

\* \* \* \* \*